United States Patent [19]
Arstein et al.

[11] Patent Number: 5,413,311
[45] Date of Patent: May 9, 1995

[54] GAS VALVE

[75] Inventors: Dale C. Arstein, Elk River; Lee R. Rensberger, Monticello, both of Minn.

[73] Assignee: Tescom Corporation, Elk River, Minn.

[21] Appl. No.: 203,431

[22] Filed: Mar. 1, 1994

[51] Int. Cl.⁶ .............................................. F16K 7/16
[52] U.S. Cl. .................... 251/331; 251/229; 251/368
[58] Field of Search .................. 251/331, 229, 368

[56] References Cited

U.S. PATENT DOCUMENTS

| | | | |
|---|---|---|---|
| 3,405,907 | 10/1968 | Kayser | 251/331 X |
| 3,918,495 | 11/1975 | Abrahams | 251/331 X |
| 4,741,510 | 5/1988 | Baumann | 251/331 X |
| 5,112,027 | 5/1992 | Hanyu et al. | 251/331 |
| 5,253,671 | 10/1993 | Kolenc | 251/331 X |

*Primary Examiner*—Stephen M. Hepperle
*Attorney, Agent, or Firm*—Palmatier, Sjoquist & Helget

[57] ABSTRACT

A gas flow valve having an internal valve chamber with an inlet and outlet passage, and a movable metallic diaphragm in the chamber, the diaphragm bonded to a valve stem projecting outside of the chamber. The diaphragm has a Teflon film coating which is engageable against at least one of the inlet and outlet passages in sealing relationship, and the valve stem has a spring-biasing member outside the chamber for urging the diaphragm away from sealing engagement with the inlet and outlet passages. A peripheral rib is formed in a chamber wall and the diaphragm is held in fixed relationship against the peripheral rib.

6 Claims, 3 Drawing Sheets

GAS VALVE

BACKGROUND OF THE INVENTION

The present invention relates to gas valves; more particularly, the invention relates to a gas valve having a diaphragm closure member, wherein the valve is structured to eliminate contaminants from the gas flow path.

Contaminant-free gas valves have application in use in systems for handling high purity, reactive and hazardous gases. Such applications are typically found in specialty gas handling equipment, process gas purge panels and manifolds, compressed gas cylinder cabinets, gas analysis and sampling equipment, chromatography equipment and instrumentation and research equipment. In such applications it is desirable, and sometimes absolutely critical, to provide a volume flow of gas wherein no contaminant materials are introduced into the gas flow volume by any components in the flow system, particularly movable and adjustable valves. It is known that contaminants are produced by valve seal components having pliable characteristics, wherein minute particles of the valve seal material may break loose from the seal and enter into the gas flow path. It is also known that contaminants may be introduced into the gas flow path from other moving components in the valve chamber, such as the metal compression spring which is typically placed in the valve chamber. The metal spring exerts an opening force in opposition to an externally-driven actuating member, and contaminant particles may break away from the spring over extended use. Such particles may include various metal oxides, plating components, and other particulate matter.

It is therefore desirable to provide a gas flow system wherein all of the interior components and surfaces which are directly exposed to the gas flow stream are free from contaminants, or are entirely non-reactive with the gases flowing through the system. It is relatively easy to design a gas flow system wherein the fixed components are constructed from materials which meet the non-contaminating and non-reactive standards. It is somewhat more difficult to design components which have moving or movable parts to be free from contaminating or reacting with the gas. In particular, the materials which usually make the most effective valve seals also have a propensity to release contaminants into the gas flow stream. Even valve springs, which may be made from non-reactive metallic materials, can become a source of contaminants through extended use. Contact with reactive gases in the flow path may result in the buildup of surface oxides on the springs, and oxide particulates may break away from the spring and enter the flow path. Continuous and extensive operation of a spring may result in the release of particulates either from the spring plating materials or from the spring base material.

SUMMARY OF THE INVENTION

The present invention provides a gas flow valve having all moving components isolated from the gas flow stream, except a metallic diaphragm which functions as the valve closure member. The diaphragm is affixed to a spring-biased valve stem which is movable by an external valve activation mechanism. One surface of the diaphragm is exposed in a chamber through which the gas flow is directed, wherein the central portion of the diaphragm surface operates as a closure member over an inlet port. A peripheral portion of the diaphragm surface engages against a circular rib in the chamber to provide a gas seal, which prevents gas flow from leaking outside the chamber. The central portion of the diaphragm surface is coated with a non-reactive film such as Teflon (trademark) to assist in forming the valve seal, and the remaining diaphragm surface is otherwise uncoated. The valve closure seal is provided by applying a force against the center portion of the diaphragm of sufficient magnitude to deflect the diaphragm a predetermined amount to tightly engage the Teflon film against the valve body.

It is the principal object of the invention to provide a gas valve having contaminant-free interior gas flow surfaces.

It is another object of the present invention to provide a gas valve having an internal valve chamber exposed to the gas flow path which is constructed entirely from non-reactive materials.

It is another object of the invention to provide a gas valve having no moving parts exposed to the gas flow stream which can contribute to contamination of the gas.

The foregoing and other objects and advantages of the invention will become apparent from the following specification and claims, and with reference to the appended drawings.

DESCRIPTION OF THE PREFERRED EMBODIMENT

Figure 1:
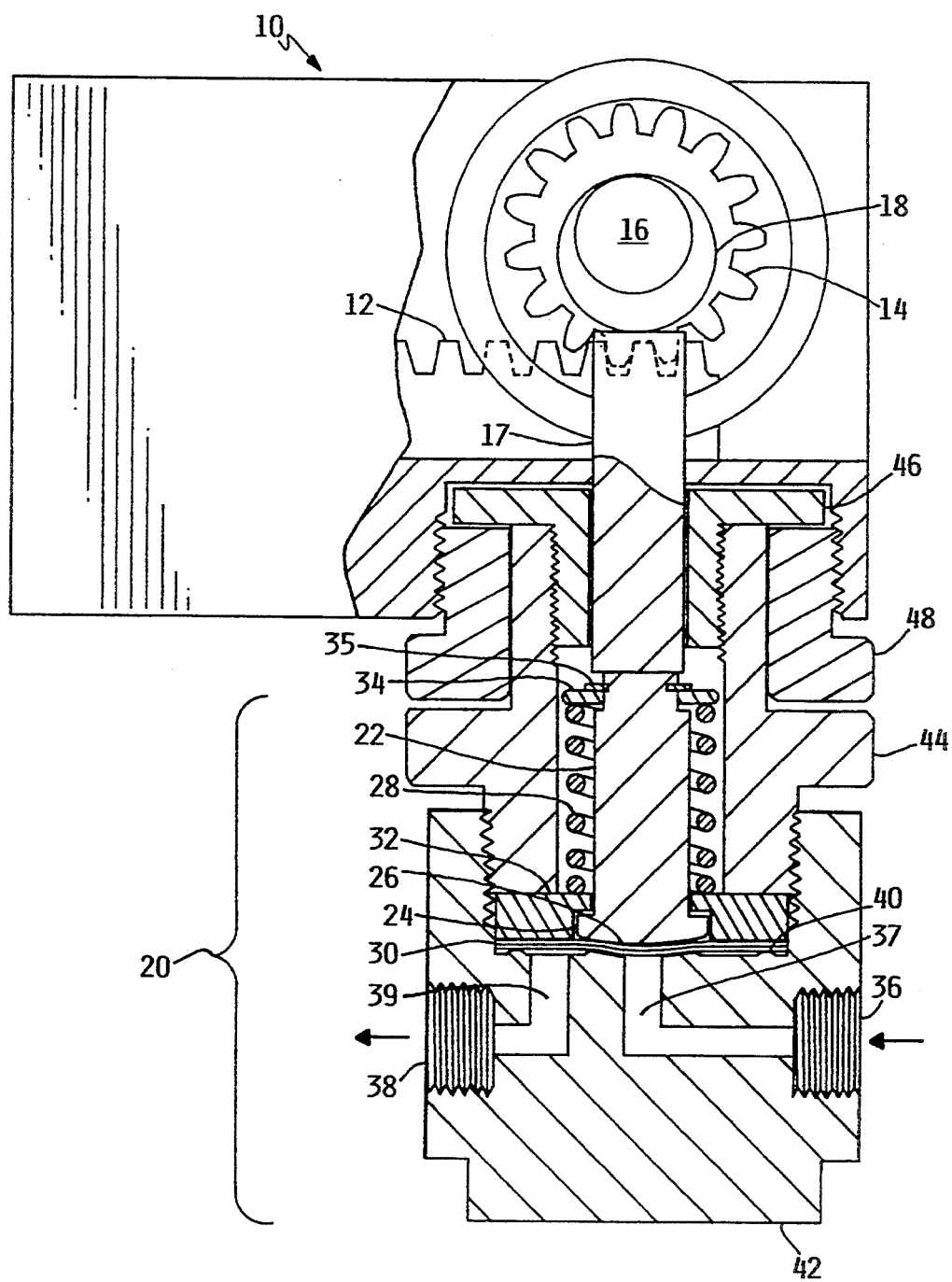
FIG. 1 shows an elevation view in partial cross section, illustrating the gas valve and an operable actuator.

Referring first to FIG. 1, there is shown a valve actuator 10 connected to gas valve 20. Actuator 10 is illustrated in a representative form; it should be understood that other forms of actuators could equally well be used in conjunction with the present invention. For example, a screw-threaded handle could be selected as the actuator mechanism, or an air-operated piston could also be selected for this purpose. In the embodiment shown, the valve actuator 10 includes a movable rack gear 12 which is engaged to a pinion gear 14. Pinion gear 14 is rotatably mounted on a shaft 16, and shaft 16 also has a cam 18 affixed thereto. The rack gear 12 may be horizontally movable via an external actuating mechanism, thereby causing rotation of shaft 16 through engagement with pinion gear 14. Rotation of shaft 16 causes simultaneous rotation of cam 18 which is engaged against a push rod 17. Push rod 17 therefore travels through a limited vertical path in response to engagement of the valve actuator 10.

Push rod 17 extends axially through an opening in valve 20 to engage the end of a valve stem 22. The lower end of valve stem 22 has a projecting shoulder 24, and the lower end surface 26 of valve stem 22 is formed as a spherical surface. Surface 26 is affixed to a diaphragm 30 by a bonding process such as welding. Diaphragm 30 is preferably made from one or more relatively thin sheets of a cobalt chrome nickel alloy material.

Valve stem 22 is axially confined within a compression spring 28, and compression spring 28 is compressed between a stop member 32 and a washer 34. Washer 34 is confined beneath a spring "C" clip 35 which is engaged into a circumferential slot about valve stem 22.

An inlet port 36 is coupled via a passage 37 to a central opening into the valve chamber. An outlet port 38 is coupled via a passage 39 to an opening in the same chamber, displaced at a predetermined radius from the center passage 37. An annular rib 40 is positioned about a radius in the same chamber, the radius being greater than the radial entry position of passage 39. Diaphragm 30 is always positioned in sealing engagement against annular rib 40, being confined in that position by stop member 32.

Valve 20 is constructed by threadably securing a lower housing 42 to a center housing 44 so as to clamp the diaphragm 30 between stop member 32 and annular rib 40. A guide flange 46 is threadably secured into the upper end of center housing 44, confining a locknut 48 axially along the outer surface of center housing 44. Locknut 48 may be threadably secured into a valve actuator 10 to locate valve 22 relative to the actuator mechanism.

Figure 2:
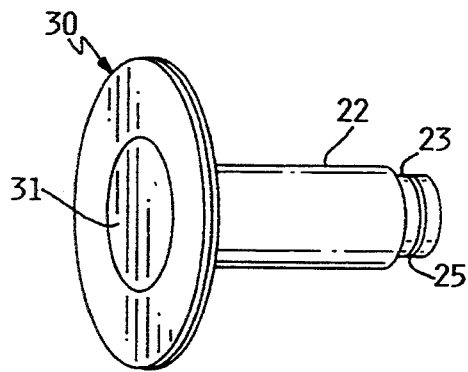
FIG. 2 shows an isometric view of the diaphragm and valve stem.

FIG. 2 shows an isometric view of diaphragm 30 and valve stem 22. Diaphragm 30 is formed of one or more metallic disks which are attached by welding to valve stem 22. The disks are preferably made from a cobalt chrome nickel alloy material, with each disk having a thickness in the range of 0.003–0.010 inch. The lower surface of diaphragm 30 has a circular area 31 covered by a film layer. The film layer is preferably fluorinated ethylene propylene (FEP), also known under the trademark "Teflon." The Teflon film is preferably sprayed onto the lower surface of diaphragm 30 to a thickness of 1–1½ mils, although other thicknesses will also perform satisfactorily. Valve stem 22 is bonded to the upper surface of diaphragm 30 and valve stem 22 has a reduced diameter end 23 which has a slot 25 therein for accepting the spring clip 35.

Figure 3:
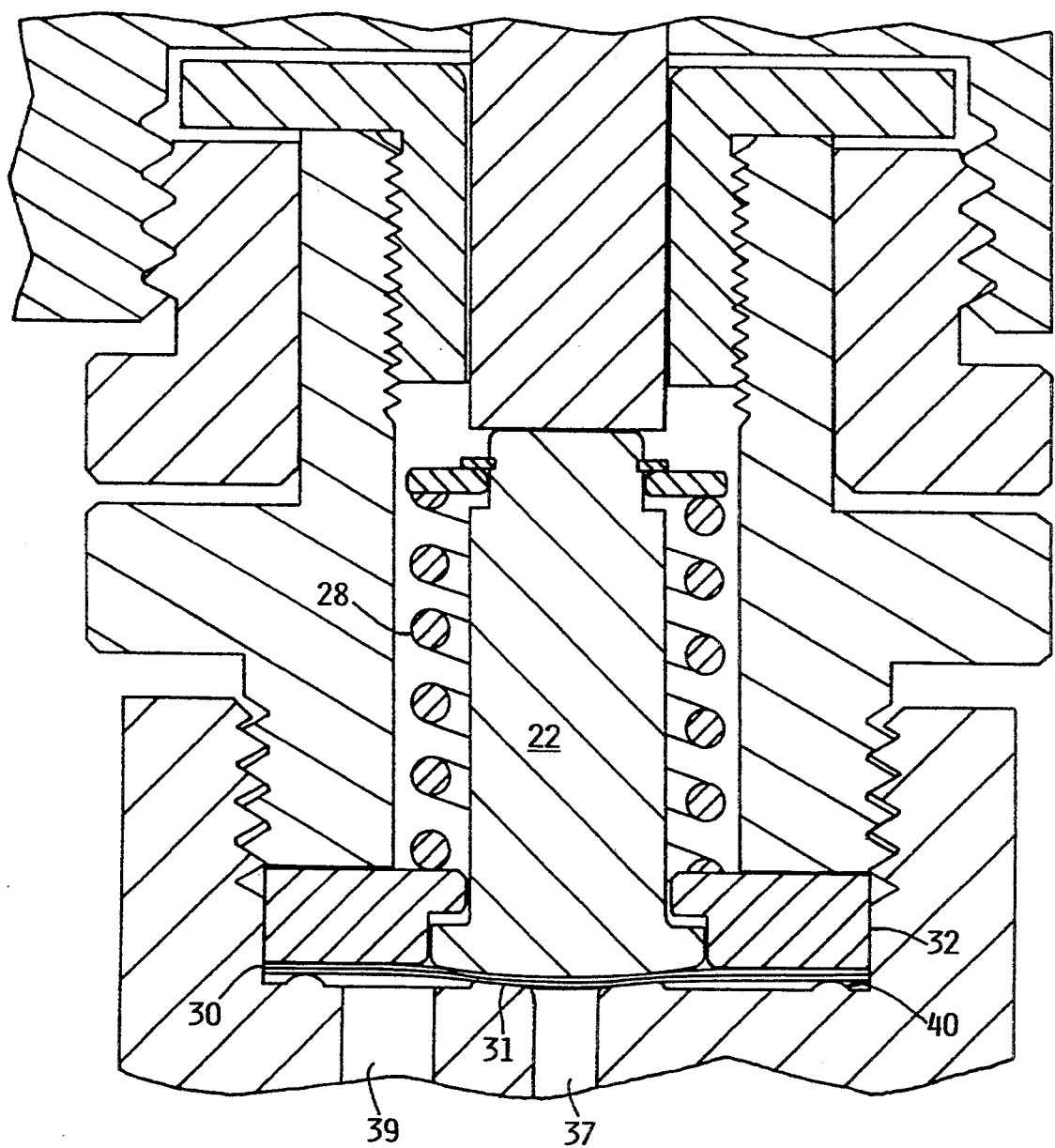
FIG. 3 shows an expanded view of the components in the valve chamber in one operable position.

FIG. 3 shows an expanded view of a portion of valve 20, particularly the portion associated with the diaphragm and valve chamber. In this view, the valve is shown in the closed position, wherein diaphragm 30 is tightly engaged against a circular central valve seating area 31. In this position the center portion of diaphragm 30 is deformed downwardly to engage the valve seating area 31. Valve seat 31 is machined along an inwardly sloping angle of $3\frac{1}{2}°\pm\frac{1}{2}°$, and is preferably machined to a tolerance of ±1 mil (0.001 inch). Valve stem 22 deforms diaphragm 30 downwardly at its center region so as to provide a facing and sealing contact against the sloped valve seating area 31. Diaphragm 30 is also tightly engaged between stop member 32 and circular rib 40.

Figure 4:
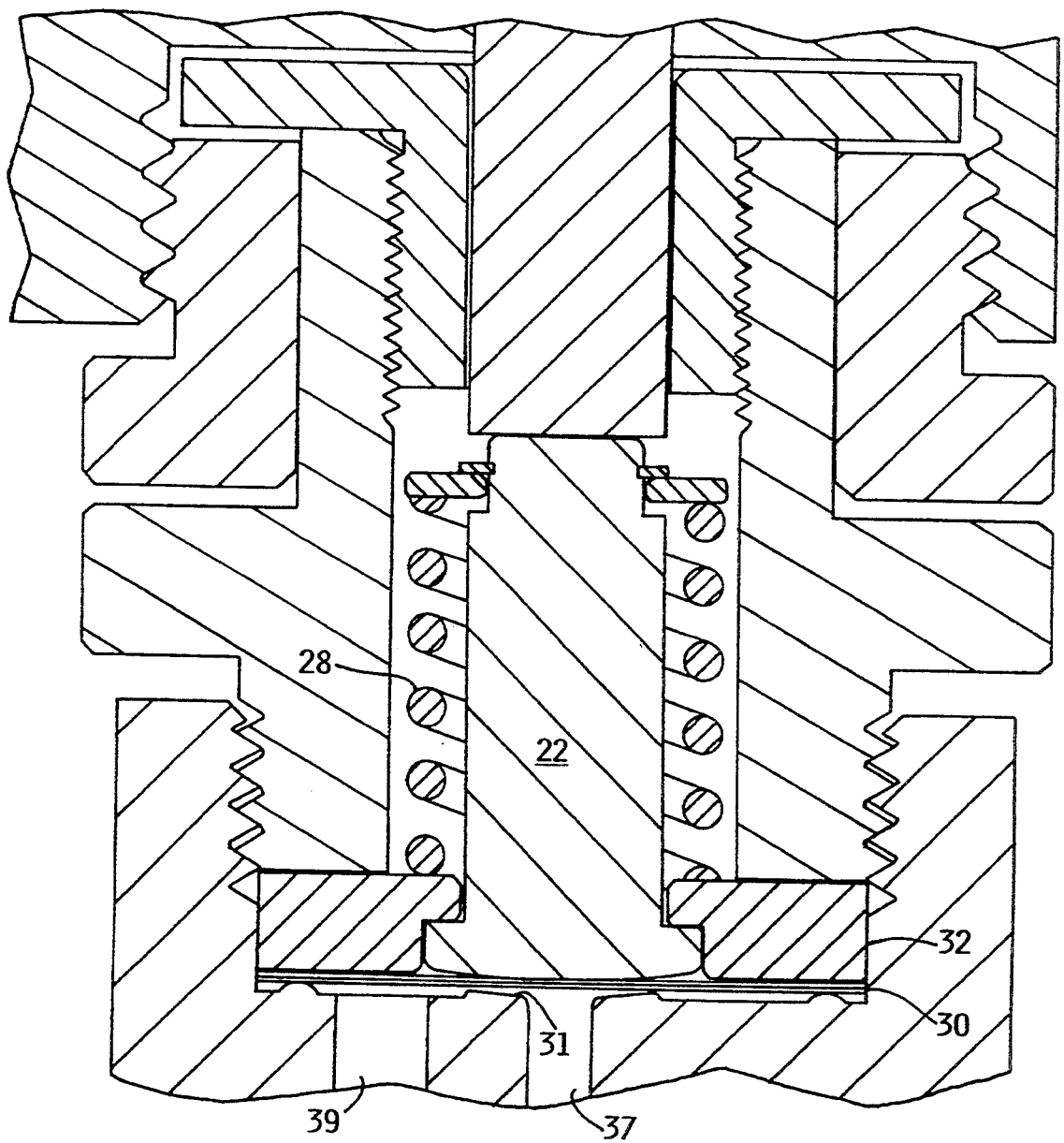
FIG. 4 shows an expanded view of the components in the valve chamber in a second operable position.

FIG. 4 shows the valve in a second operable position, which corresponds to the open valve position. In this position, valve stem 22 is moved upwardly until it engages the stop member 32, thereby providing a flow path gap between diaphragm 30 and valve seating area 31. This gap provides a flow path from passage 37 to passage 39, and therefore permits gas flow from inlet port 36 to outlet port 38.

In operation, a valve closing force provided by an external actuator is sufficient to maintain diaphragm 30 in a closed, sealed position against valve seating area 31. When the external actuator force is released the valve spring 28 provides an upward force to raise valve stem 22 upwardly, and to thereby lift diaphragm 30 from engagement against valve seat 31. A flow path is therefore provided through the valve.

The Teflon film coating about the center portion of the lower surface of diaphragm 30 has been found to be non-reactive with gases of the type intended for use with the valve. Further, compression spring 28 is confined to an operable position outside the gas flow chamber formed beneath the diaphragm, and therefore contaminants emitted by the spring are isolated from the valve chamber. As a result, the gas flow through the valve is free from contact with contaminants and reactive materials.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A gas valve, comprising:
  a) a valve body having an inlet and outlet port, an internal valve chamber, and passages respectively connecting said inlet and outlet ports to said chamber, said passages having openings into said chamber through a first wall in said chamber; wherein at least one of said passage openings through said first wall further comprises a circular seating area periphery, said seating area having a recessed taper toward its center;
  b) a raised rib in said first wall, said rib defining a closed periphery about both of said passage openings;
  c) a stop member adjacent said chamber, said stop member having a central opening therethrough and having a surface defining a second wall in said chamber, said second wall being in spaced apart and facing relationship to said first wall;
  d) a diaphragm formed of one or more metallic disks in said chamber between said first and second walls, said diaphragm being sealably clamped between said rib and said stop member; wherein said diaphragm further comprises a surface facing toward said first wall, said surface having a fluorinated ethylene propylene film region positioned adjacent said circular seating area periphery;
  e) a valve stem having a spherical radius surface affixed to said diaphragm and extending through the central opening in said stop member, and means outside said chamber for spring-biasing said valve stem toward said stop member; wherein said one or more metallic disks is bonded to said valve stem spherical radius surface, and the other of said one or more metallic disks has said film region applied thereto; and
  f) actuator means for selectively forcing said valve stem and said diaphragm toward said first wall, whereby said diaphragm sealably closes at least one of said passage openings.

2. The apparatus of claim 1, wherein said means for spring biasing said valve stem further comprises a metal compression spring.

3. The apparatus of claim 2, further comprising an annular groove about said valve stem, and a removable spring clip in said groove, whereby said compression spring is confined between said spring clip and said stop member.

4. The apparatus of claim 1, wherein said circular seating area periphery further comprises a recessed taper of $3\frac{1}{2}°\pm\frac{1}{2}°$.

5. The apparatus of claim 1, wherein said film region further comprises a film thickness in the range of 0.001 inch to 0.0015 inch.

6. The apparatus of claim 5, wherein said circular seating area periphery further comprises a recessed taper of $3\frac{1}{2}°\pm\frac{1}{2}°$.

* * * * *